(12) United States Patent
Al Kadem et al.

(10) Patent No.: US 10,983,513 B1
(45) Date of Patent: Apr. 20, 2021

(54) AUTOMATED ALGORITHM AND REAL-TIME SYSTEM TO DETECT MPFM PREVENTIVE MAINTENANCE ACTIVITIES

(71) Applicant: Saudi Arabian Oil Company, Dhahran (SA)

(72) Inventors: Mohammad Saeed Al Kadem, Qatif (SA); Mohammed Gomaa, Dhahran (SA); Karam Sami Al Yateem, Qatif (SA); Abdulmonam Saud Al Maghlouth, Dhahran (SA); Abdullah Ahmed Alghamdi, Dhahran (SA); Mazen Alnofal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/876,858

(22) Filed: May 18, 2020

(51) Int. Cl.
  *G08B 29/00* (2006.01)
  *G05B 23/02* (2006.01)
  (Continued)

(52) U.S. Cl.
  CPC ........... *G05B 23/027* (2013.01); *F17D 1/005* (2013.01); *F17D 3/01* (2013.01); *G01F 1/44* (2013.01);
  (Continued)

(58) Field of Classification Search
  CPC .. G05B 23/027; G05B 15/02; G05B 23/0283; G05B 23/0272; G01F 1/74; G01F 1/58;
  (Continued)

(56) References Cited

U.S. PATENT DOCUMENTS

| 6,234,030 B1 * | 5/2001 | Butler ..................... E21B 21/06 73/861.04 |
| 6,658,944 B2 | 12/2003 | Melnikov et al. |

(Continued)

FOREIGN PATENT DOCUMENTS

| CN | 102603086 | 7/2012 |
| WO | 2006010875 | 2/2006 |
| WO | 2009114508 | 9/2009 |

OTHER PUBLICATIONS

Ahmed et al., "Pushing the Limits of Distributed Temperature Survey Analysis in Mega-Reach Power Water Injectors," Society of Petroleum Engineers, SPE, Nov. 10, 2014, 8 pages.

(Continued)

*Primary Examiner* — Toan N Pham
(74) *Attorney, Agent, or Firm* — Fish & Richardson P.C.

(57) ABSTRACT

Systems and methods include a system for processing health information for multiphase flow meters (MPFMs) of different types and at one or more different locations. Multiphase flow meter (MPFM) readings of different MPFM types are received in real-time from MPFMs at different locations. For each MPFM, an MPFM health rule that corresponds to the MPFM readings is determined using the MPFM readings and logic of MPFM health rules. A recommendation is determined for each MPFM based on the MPFM health rule. A health status and an alarm priority are determined for each MPFM using the MPFM readings and the logic of MPFM health rules. A dashboard is presented to a user that includes, for each MPFM, the MPFM readings, the recommendation, the health status, and the alarm priority.

20 Claims, 11 Drawing Sheets

(51) Int. Cl.

| | | |
|---|---|---|
| *F17D 3/01* | (2006.01) | |
| *G01F 1/44* | (2006.01) | |
| *G01F 5/00* | (2006.01) | |
| *F17D 1/00* | (2006.01) | |
| *G01F 1/74* | (2006.01) | |
| *E21B 49/08* | (2006.01) | |
| *E21B 47/06* | (2012.01) | |

(52) U.S. Cl.
CPC ............... *G01F 1/74* (2013.01); *G01F 5/005* (2013.01); *G05B 23/0272* (2013.01); *G05B 23/0283* (2013.01); *E21B 47/06* (2013.01); *E21B 49/0875* (2020.05)

(58) Field of Classification Search
CPC ... G01F 1/78; G01F 25/00; G01F 1/44; G01F 5/005; E21B 47/008; E21B 37/06; E21B 47/06; E21B 47/0875; C10G 33/08; G05D 7/0617; F17D 1/009; F17D 3/01
See application file for complete search history.

(56) References Cited

U.S. PATENT DOCUMENTS

| | | | |
|---|---|---|---|
| 6,935,189 B2 * | 8/2005 | Richards | G01F 1/74 73/861.04 |
| 7,062,420 B2 | 6/2006 | Poe, Jr. | |
| 7,332,459 B2 | 2/2008 | Collins et al. | |
| 7,561,998 B2 | 7/2009 | Panga et al. | |
| 7,603,261 B2 | 10/2009 | Tardy | |
| 7,827,869 B2 | 11/2010 | Kitami et al. | |
| 7,942,065 B2 | 5/2011 | Xie | |
| 8,849,639 B2 | 9/2014 | Brown et al. | |
| 9,159,166 B2 | 10/2015 | Finn et al. | |
| 9,176,245 B2 | 11/2015 | Craig | |
| 9,671,524 B2 * | 6/2017 | Abitrabi | E21B 43/32 |
| 9,671,793 B2 | 6/2017 | Atherton | |
| 9,732,592 B2 | 8/2017 | Carvajal et al. | |
| 10,309,910 B2 | 6/2019 | Sharma et al. | |
| 10,458,224 B2 * | 10/2019 | Dickenson | E21B 47/07 |
| 2002/0120429 A1 | 8/2002 | Ortoleva | |
| 2009/0216456 A1 | 8/2009 | Poe, Jr. | |
| 2010/0217531 A1 | 8/2010 | Day | |
| 2011/0178870 A1 | 7/2011 | Ravichandran et al. | |
| 2011/0179103 A1 | 7/2011 | Ravichandran et al. | |
| 2011/0288843 A1 | 11/2011 | Weng et al. | |
| 2013/0073272 A1 | 3/2013 | Wallace et al. | |
| 2013/0096899 A1 | 4/2013 | Usadi | |
| 2014/0182841 A1 | 7/2014 | Lecerf et al. | |
| 2014/0212006 A1 | 7/2014 | Zhao et al. | |
| 2014/0215033 A1 | 7/2014 | Ravichandran et al. | |
| 2014/0350859 A1 | 11/2014 | Lin et al. | |
| 2014/0358510 A1 | 12/2014 | Sarkar et al. | |
| 2015/0016320 A1 | 1/2015 | Pelletier et al. | |
| 2015/0024976 A1 | 1/2015 | Albrighton et al. | |
| 2015/0066461 A1 | 3/2015 | Kacewicz | |
| 2016/0356125 A1 | 12/2016 | Bello et al. | |
| 2019/0018742 A1 | 1/2019 | Thomsen et al. | |
| 2019/0222560 A1 | 7/2019 | Ford et al. | |
| 2019/0354407 A1 | 11/2019 | Booss et al. | |

OTHER PUBLICATIONS

Al-Kadem et al., "A Decade of Experience with Multiphase Flow Meters," IPTC 18162, Presented at the International Petroleum Technology Conference, Kuala Lumpur, Malaysia, Dec. 10-12, 2014; International Petroleum Conference, 2014, 15 pages.

Arukhe et al., "Saudi Arabia's Manifa Giant Offshore Field Development: The Role of Technology," Society of Petroleum Engineers, SPE, Jan. 1, 2014, 17 pages.

Bahadori, "Estimation of Potential Precipitation From an Equilibrated Calcium Carbonate Aqueous Phase Using Simple Predictive Tool," Society of Petroleum Engineers, SPE 132403-PA, SPE Projects, Facilities and Construction, vol. 6, Issue 4, Dec. 2011, 8 pages.

Ballo et al., "The Use of Real Time Downhole Pressure and Distributed Temperature Surveying in Quantifying the Skin Evolution and Zone Coverage in Horizontal Well Stimulation," Journal of Petroleum Technology, Oct. 8, 2012, 8 pages.

blogs.sap.com [online], "Zero downtime option of SUM (ZDO) is 'available on request,'" Feb. 2016, retrieved on Jun. 23, 2020, retrieved from URL <https://blogs.sap.com/2016/02/25/zero-downtime-option-of-sum-zdo-is-available-on-request/>, 11 pages.

blogs.sap.com [online], Herman, "Minimize your downtime of an update," Mar. 2015, retrieved on Jun. 23, 2020, retrieved from URL <https://blogs.sap.com/2015/03/11/minimize-your-downtime-of-an-update/>, 7 pages.

Duru et al., "Combined Temperature and Pressure Data Interpretation: Applications to Characterization of Near-Wellbore Reservoir Structures," SPE Annual Technical Conference, Oct. 30-Nov. 2, 2011, 18 pages.

Goh et al., "IPTC 14274 Application of Permanent Reservoir Monitoring Data (DTS* & PDG*) in a Mature Offshore Malaysian Oilfield, for Production Optimisation and Workover Control," International Petroleum Technology Conference (IPTC), Feb. 7, 2012, 12 pages.

Hamid et al., "A Practice Method of Prediction Calcium Carbonate Scale Formation in Well Completions," Society of Petroleum Engineers, SPE 168087-PA, SPE Production and Operations, vol. 31, Issue 1, Feb. 2016, 11 pages.

Larson and Buswell, "Calcium Carbonate Saturation Index and Alkalinity Interpretations," State of Illinois, Cicular No. 22, Department of Registration and Education State Water Survey Division, Urbana Illinois, reprinted from the American Water Works Association vol. 34, No. 11, Nov. 1942, 1943, 15 pages.

launchpad.support.sap.com [online], "1035051—Transportable tablespaces," Sep. 2011, retrieved on Jun. 28, 2020, retrieved from URL <https://launchpad.supportsap.com/#/notes/1035051>, 10 pages.

launchpad.support.sap.com [online], "2620180—NZDT—Composite SAP Note—DMIS 2011," 2011, retreived on Jun. 28, 2020, retrieved from URL <https://launchpad.support.sap.com/#/notes/2620180 =, 17 pages.

Reddichala et al., "Next-Generation Data-Driven Analytics—Leveraging Diagnostic Analytics in Model Based Production Workflows," SPE 195014; Presented at the SPE Middle East Oil and Gas Show and Conference, Manama, Bahrain, Mar. 18-21, 2019; Society of Petroleum Engineers, 2019, 18 pages.

sap.com [online], "Overview—System Copy and Migration with Software Provisioning Manager 1.0," Sep. 2017, retrieved on Jun. 23, 2020, retrieved from URL <https://www.sap.com/documents/2015/07/c239f2c0-5b7c-0010-82c7-eda71af511fa.html>, 8 pages.

Stiff et al., "A Method of Predicting the Tendency of Oil Field Waters to Deposit Calcium Carbonate," Society of Petroleum Engineers, Journal of Petroleum Technology, SPE-952213-G, vol. 4, Issue 9, Sep. 1952, 4 pages.

Support.sap.com [online], "SAP Software Provisioning Manager," retrieved on Jun. 23, 2020, retrieved from URL <https://support.sap.com/en/tools/software-logistics-tools/software-provisioning-manager.html>, 3 pages.

Vetter et al., "Calcium Carbonate Scale in Oilfield Operations," Society of Petroleum Engineers, SPE Annual Technical Conference and Exhibition, Dallas Texas, SOE-16908-MS, Sep. 27-30, 1987, 16 pages.

Yeboah et al., "A New and reliable Model for Predicting Oilfield Scale Formation," Society of Petroleum Engineers, SPE International Symposium on Oilfield Chemistry, New Orleans, Louisiana, SPE 25166-MS, Mar. 2-5, 1993, 10 pages.

* cited by examiner

AUTOMATED ALGORITHM AND REAL-TIME SYSTEM TO DETECT MPFM PREVENTIVE MAINTENANCE ACTIVITIES

BACKGROUND

The present disclosure applies to techniques for maintaining multiphase flow meters (MPFMs).

Metering with MPFMs is a well-proven "intelligent field" technology that is used, for example, in the petroleum industry. Metering can use complex flow models and radioactive detection mechanisms to accurately measure multiphase flow. For example, MPFMs can be used to measure the flow of oil, gas, and water on a regular basis. The use of MPFM sensor data technology can lead to reduced maintenance costs, improved maintenance schedules, improved safety, minimized visits, and better predictions of well performance.

MPFMs can also be used to perform comprehensive test validation in a short period of time. Leveraging the capabilities of MPFMs, engineers can perform various production analysis scenarios remotely using continuous data streaming. These scenarios can reduce (and ultimately eliminate) the reliance on operators and vendors in remote fields. However, a major disadvantage of MPFMs is the requirement for frequent maintenance. This disadvantage can become a major issue, for example, when a greater quantity of meters are involved.

SUMMARY

The present disclosure describes techniques that can be used for maintaining multiphase flow meters (MPFMs). For example, intuitive applications can be used to monitor MPFMs using predefined logic to proactively prevent equipment failure. The logic that is applied can use real-time parameters under the 4th industrial revolution (IR 4.0) umbrella. For example, the term real-time can correspond to events that occur within a specified period of time, such as within a few minutes or seconds.

In some implementations, a computer-implemented method includes the following. MPFM readings of different MPFM types are received in real-time from MPFMs at different locations. For each MPFM, an MPFM health rule that corresponds to the MPFM readings is determined using the MPFM readings and logic of MPFM health rules. A recommendation is determined for each MPFM based on the MPFM health rule. A health status and an alarm priority are determined for each MPFM using the MPFM readings and the logic of MPFM health rules. A dashboard is presented to a user that includes, for each MPFM, the MPFM readings, the recommendation, the health status, and the alarm priority.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, the techniques can improve health, safety, and environmental conditions by reducing the amount of exposure to radiation sources. Second, using the monitoring solution can provide cost savings associated with logistical arrangements by optimizing engineering and reducing numbers of boat visits. Third, operational excellence (OE) initiatives can be improved, including improving asset efficiency. Fourth, annual savings, including operating expenditures (OPEX), can be realized by reducing costly offshore visits and optimizing visits that are made to focus on problematic MPFMs. For example, optimizing visits can refer to achieving a same quality level of service while reducing the number of maintenance trips, where the level of service is greater than a predefined threshold. Fifth, the monitoring solutions can reduce repetitive failures, reduce downtimes of metering equipment, facilitate remote diagnoses of equipment failures, and reduce the number of visits to offshore sites (where weather conditions can often suspend critical operations). Sixth, a common monitoring solution can eliminate deficiencies caused by different MPFM service companies having their own software, logic, and equations. Seventh, real-time parameters can be used to produce alarms with impeded logic for all service company MPFMs. Eighth, key health indicators can be captured and read on a real-time basis. Ninth, alarms can be generated based on critical MPFM-measured parameters such as rates, differential pressure, radioactive measurements, pressures, and input voltage. Tenth, MPFMs can be used to increase the efficiency and running time equipment and obtain reliable rate readings.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 1B-1 and 1B-2 collectively show a screenshot of an example of a user interface for displaying MPFM health information, according to some implementations of the present disclosure.

FIGS. 1D-1 and 1D-2 collectively show a screenshot of another example of a user interface for displaying MPFM health information, according to some implementations of the present disclosure.

FIGS. 1E-1 and 1E-2 collectively show a screenshot of another example of a user interface for displaying MPFM health information, according to some implementations of the present disclosure.

FIG. 2 is a flowchart of an example of a method for generating MPFM health information, according to some implementations of the present disclosure.

DETAILED DESCRIPTION

Figures 1, 1A:
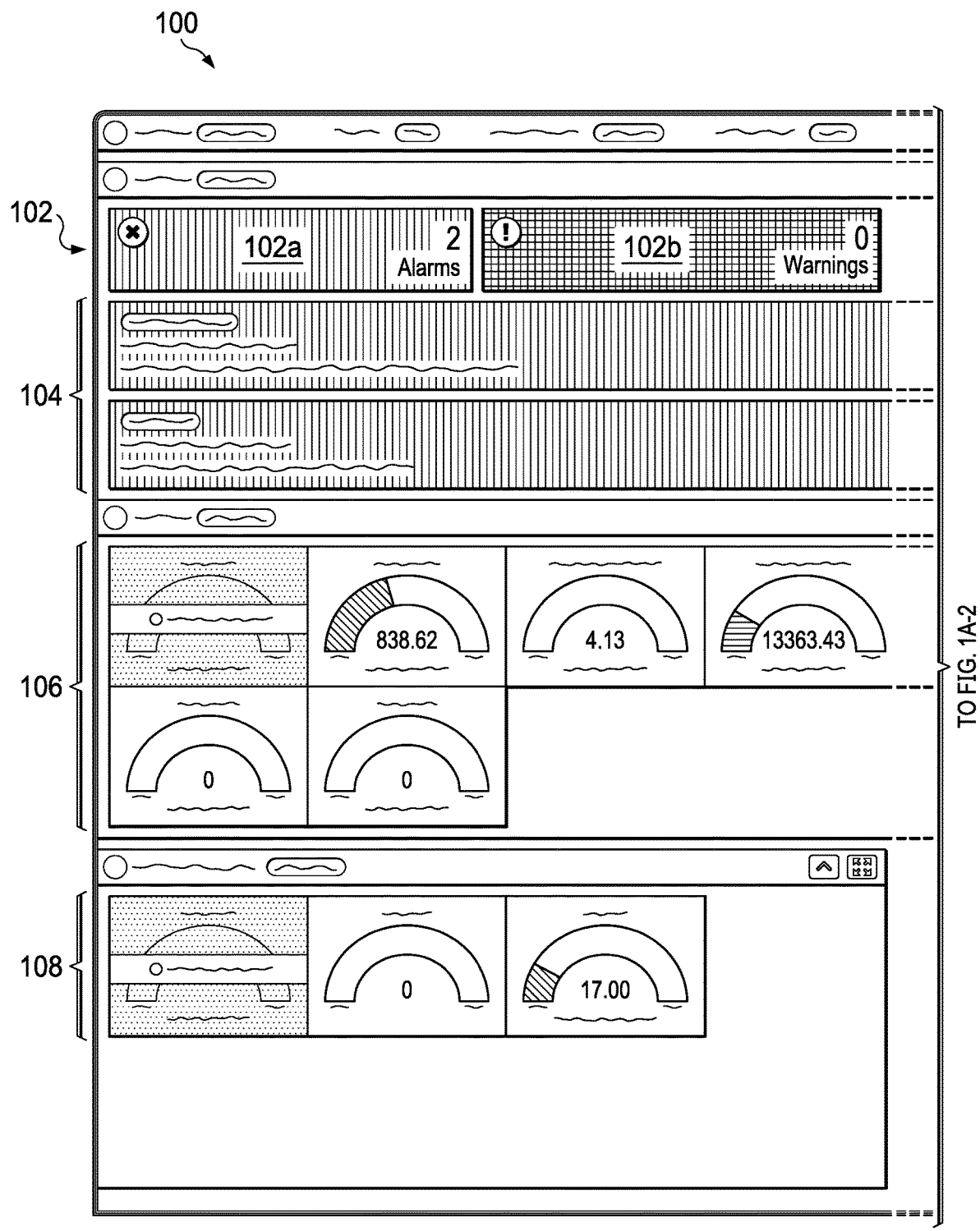
FIGS. 1A-1 and 1A-2 collectively show a screenshot of an example of a user interface for displaying multiphase flow meter (MPFM) health information, according to some implementations of the present disclosure.

The following detailed description describes techniques for maintaining multiphase flow meters (MPFMs). Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, a set of rules can be used for automatically triggering alarms in real time upon determining that a rule is violated, or that conditions of the rule are met. For example, the term real-time can correspond to events that occur within a specified period of time, such as within a few minutes or seconds. The triggered alarms can allow an engineer to diagnose and identify the failure type. The engineer can complete this work using a desktop application or a mobile application, for example.

Service companies may each have different metering technologies using different logic, algorithms, and complexity to obtain flow measurements. Techniques of the current disclosure can be used to unify the logic from all meters to provide alarms pertaining to MPFM healthiness. For example, a common set of simplified logic can be used to achieve the same functions and objectives. In some implementations, transition logic associated with specific types of meters can be used to translate information received from the meters into a common format. The transformation logic can be table-driven, for example.

Real-time data can be extracted continuously from plant information (PI) systems, eliminating the need for manual entry of data. Tracking mechanisms can be placed on alarms that exist associated with meters located in the field. Generated alarms can target meter healthiness in addition to identifying communication issues and data quality. In some cases, the generated alarms can help in evaluating and recommending required time intervals and schedules for performing preventative maintenance on each meter and field, where the time intervals and schedules are based on meter performance, historical data, and current readings. These techniques can result in reducing necessary field visits, which can be especially beneficial for offshore environments.

Generated alarms can target the status of meters at a field level. The status information can range from meter start-up power status through supervisory control and data acquisition (SCADA)/PI communication status and statuses for states and events in between.

MPFMs can have the capability to perform comprehensive real-time test validation in a short period of time. By leveraging the capabilities of MPFMs, engineers can perform various production analysis scenarios remotely using continuous data streaming to reduce and ultimately eliminate reliance on operators and vendors in remote fields. Because MPFMs typically require frequent maintenance, managing a greater quantity of meters can be difficult and costly. These issues provide a driving force behind the techniques described in the present disclosure.

Applications can be developed that support the objectives of remotely monitoring the health of all MPFMs on a real-time basis. An in-house analytics system, such as one or more central monitoring systems, can include various modules. In some implementations, the analytics system can include modules such as a Field Overview Module, an MPFM Overview Module, a Well Test Management Module, and an Alarm Management Module. Such modules can support solutions that cover infrastructure requirements, visualization requirements, optimization, and prediction. For example, optimization can refer to achieving a same quality level of service while reducing the number of maintenance trips, where the level of service is greater than a predefined threshold.

The analytics system can provide an interface, including a user interface, for engineers to detect and prevent major MPFM component failures proactively and to highlight all types of projected MPFM component failures. The interface can be used by engineers to obtain information by proactively harvesting preset alarms. The information can be used by the engineers to take actions to prevent internal MPFM parts from failing. Alarms can be generated based on critical parameters measured by the MPFM such as rates, differential pressure, and radioactive measurements. The interface used by the engineers can include graphical user interface (GUI) displays linked to applications of the modules of the analytics system.

In some implementations, an analytics system can be developed and implemented using the following process. Desired diagnosis/alarming information can be configured to a plant information and engineering desktop. Business cases can be developed, including identifying associated benefits. Logic and alarm tables can be developed. Designs for presenting visualizations to users can be built. Front-ends and back-ends to the applications can be developed. Initial testing of logic and surface mapping can be performed. User acceptance forms can be submitted. Application software can be moved to production. Clearance of alarms can be monitored on a regular basis in order to quantify gained values.

The analytics system can be used for generating alarms and notifications to mitigate commonly-occurring issues associated with current existing assets of various versions and types of MPFMs. The analytics system can be developed and trained, for example, using machine learning technique (for example, during a pilot phase). While each MPFM has its own techniques for measuring oil, gas, and water rates, the analytics system can consolidate the information from the MPFMs in a unified platform. The analytics system can be used by oil and gas companies and technology providers to optimize MPFM maintenance visits, especially for offshore environments. Conventional processes for ad-hoc and planned visits are typically reactive and require significant logistical arrangements and transportation costs. The analytics system described in the present disclosure can handle all MPFM types in a fully-integrated, real-time environment, providing equipment health monitoring.

The analytics system can be implemented with health-monitoring algorithms and logic. The analytics system can also provide dashboards and visualization interfaces. The analytics system can rely on applied and automated system algorithms to detect MPFM maintenance issue for different type of meters. The alarms that can be implemented using techniques of the present disclosure can be based on experience by engineers in dealing with different types of meters and maintenance issues. The issues can include onshore and offshore issues that are usually discovered during actual visits in the field. The automation and enablement of the information availability to an engineer's desktop can be used to optimize actual visits and associated risks and safety prospects, which can be especially costly in offshore operations.

The analytics system can be used to highlight MPFM issues by utilizing a set of pre-defined logic (for example, rules) to clearly alert and recommend actions in an advisory mode. The analytics system can handle different types of meters and monitoring equipment. The analytics system can focus not only on rate abnormality and accuracy but also on facilitating actual field maintenance visits. The issues covered by the analytics system can include MPFM communication issues, MPFM flow computer issues, MPFM multi-variable transmitter (MVT) failures, MPFM power issues, MPFM temperature transmitter issues, MPFM pressure transmitter issues, and MPFM meter over-design issues. Handling these issues can help MPFM maintenance engineers to monitor, plan, schedule, and optimize MPFM maintenance visits utilizing real-time information and automated logic.

The analytics system can implement performance thresholds and rules pertaining to basic MPFM parameters and for capturing MPFM performance information for the tested wells from different reservoirs at current conditions. As more and more data is captured, algorithms of the analytics system can be trained to evaluate MPFM performance, including automatically adjusting algorithms for improved performance. The adjustments can be made as the analytics system is exposed to increasingly more data, leading to an enhancement of the performance in identifying the root causes for any failure for proactive decisions.

In some implementations, the following MPFM health logic table can be used by the analytics system to define logic associated with corresponding used parameters:

TABLE 1

MPFM Health Logic

| Logic Name | Alarm Logic | Used Parameters |
| --- | --- | --- |
| Communication issue (tags with value other than zero) | (No Data, noisy, negative, frozen data) from alarm equipment | All MPFM tags or (MPFM pressure, MPFM temperature, Venturi differential pressure (DP), mix density & gamma count reference) |
| Flow computer issue (All tags are showing zero) | All tags are showing zero | All MPFM tags |
| Multi Variable Transmitter (MVT) failure | Losing all MPFM pressure, MPFM temperature, and DP | MPFM pressure and temperature, Venturi DP |
| Down MPFM | Both MPFM pressure and Venturi DP = 0 | MPFM pressure and Venturi DP = 0 |
| MPFM power issue (in the flow computer) (works when a well is flowing through MPFM) | If the input voltage is less than 18 and greater than 24 volts | Input Voltage tag |
| Temperature Transmitter issue (works when a well is flowing through MPFM) | If MPFM line temperature not within +/−5% to WHT | MPFM line temperature wellhead temperature (WHT). Selected Well Number (well in test) |
| Pressure Transmitter issue (works when a well is flowing through | If MPFM Line pressure no twithin +/−5% of wellhead pressure | MPFM Line Pressure WHP. Selected Well Number (well in test) |

TABLE 1-continued

MPFM Health Logic

| Logic Name | Alarm Logic | Used Parameters |
| --- | --- | --- |
| MPFM) Venturi DP | (WHP) If DP less than 30 for Roxar ™; 50 mbar for Schlumberger (SLB) | Venturi DP |
| Mixture Density | If Mixture Density is not within in +/−5% of 1200 kg/m³ | Mixture Density |
| Gamma Count Rate Total | If it shows zero | Gamma meter back count |
| Oil volume Flow rate (Actual) | If Actual oil flow rate less than standard flow rate, contact maintenance team/manufacturer to troubleshoot FC | Actual rate standard rate |
| Water volume Flow rate (Actual) | If Actual water flow rate less than standard flow rate, contact maintenance team/manufacturer to troubleshoot FC | Actual rate Standard Rate |
| Gas volume Flow rate (Actual) | If Actual gas flow rate greater than standard flow rate, contact maintenance team/manufacturer to troubleshoot FC | Actual rate Standard Rate |
| Battery Issues | If FC is not equal to SCADA server time, contact maintenance team/manufacturer to troubleshoot FC/ replace FC battery | Not available |

In some implementations, the following MPFM status logic table can be used by the analytics system to define logic associated with corresponding used parameters:

TABLE 2

MPFM Status Logic

| S/N | MPFM Status Classification | Logic Description |
| --- | --- | --- |
| 1 | Operating with no alarms | MPFM Pressure more than 0 & Venturi DP is more than 0 & No alarms in any of the alarming tags |
| 2 | Operating with alarms | MPFM Pressure more than 0 & Venturi DP is more than 0 & At least 1 alarm from the alarming tags |
| 3 | Down | MPFM pressure and Venturi DP = 0 |

In some implementations, the following alarm table can define alarms that are prioritized based on the alarm severity (for example, major/minor) contributing to major maintenance work with proposed recommendations:

TABLE 3

Alarms

| Alarm Scoring | Alarm Priority | Logic Name | Recommendations |
| --- | --- | --- | --- |
| 1 | Major | Communication issue (tags with value other than zero) | Communication issue |
| 2 | Major | Flow Computer Issue (All tags are showing zero) | Flow Computer Issue |
| 3 | Major | Multi Variable | (MVT) Failure |

TABLE 3-continued

Alarms

| Scoring | Alarm Priority | Logic Name | Recommendations |
|---|---|---|---|
| 4 | Major | Transmitter MVT Failure Down MPFM | |
| 5 | Minor | MPFM Power Issue (In the flow computer) (works when a well is flowing through MPFM) | Request to maintenance to fix input power issue |
| 6 | Minor | Temperature Transmitter issue (works when a well is flowing through MPFM) | Contact vendor to troubleshoot temperature transmitter |
| 7 | Minor | Pressure Transmitter issue (works when a well is flowing through MPFM) | Contact vendor to troubleshoot pressure transmitter |
| 8 | Minor | Venturi DP | Warning: percentage of flow rate uncertainty increase. |
| 9 | Minor | Mixture Density | Calibration issue; Flush MPFM, as some fluid inside pipe electrode |
| 10 | Minor | Gamma Count Rate Total | Contact vendor to troubleshooting gamma detector system |
| 11 | Minor | Oil volume Flow rate (Actual) | Contact vendor to troubleshoot flow computer |
| 12 | Minor | Water volume Flow rate (Actual) | Contact vendor to troubleshoot flow computer |
| 13 | Minor | Gas volume Flow (Actual) | rate Contact vendor to troubleshoot flow computer |
| 14 | Minor | Battery Issues | Contact vendor to troubleshoot FC/replace FC battery. |

Figures 1, 1A, 2:
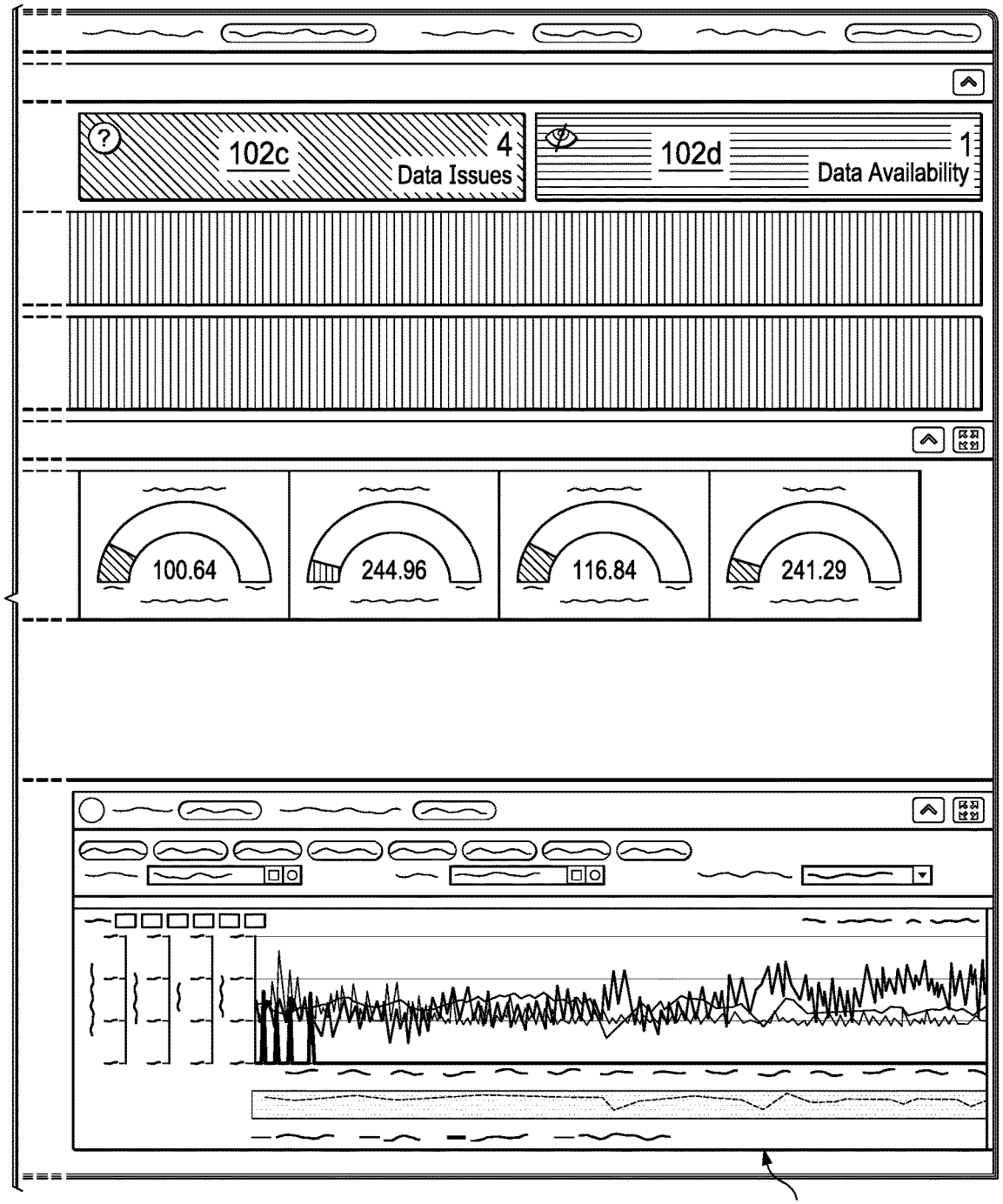

FIGS. 1A-1 and 1A-2 collectively show a screenshot of an example of a user interface 100 for displaying MPFM health information, according to some implementations of the present disclosure. The user interface 100 displays information for different group of meters having different levels of severity or priority. The user interface 100 includes a display of MPFM alarms 102, including a number of alarms 102a, a number of warnings 102b, a number of data quality issues 102c, and data availability 102d. In some implementations, the different tabs 102a-102d can be color-coded (or shaded), such as using red shading for the tab 102a to indicate a greatest severity, and yellow, green, and blue to indicate decreasing levels of severity for meters associated with tabs 102b, 102c, and 102d, respectively.

Depending on which one of the tabs 102 has been selected by the user, a summary 104 summarizing alarms per selected meter can display information for individual meters associated with the selected tab 102. The entries in the summary 104 can be color-coded (or shaded) to match the color (or shading) of the selected tab 102. In some implementations, the greatest-severity entries can be displayed, for example, by default, in the summary 104. A meter display area 106 can display representations of meters corresponding to numbers of meters for each of the tabs 102. The display area 106 can include an oil actual rate, a water actual rate, a gas actual rate, a water cut (WC) rate, a gas-to-oil (GOR) rate, a gas volume fraction (GVF), an oil rate at actual condition, a water rate at actual condition, a gas rate at actual condition, a wellhead pressure (WHP), and an MPFM line pressure. Portions of representations can be color-coded (or shaded) to match the different severities of the tabs 102. Region 108 is an area for displaying different sources for comparing the rates such as an MPFM oil rate, a virtual meter oil rate, and a pump curve oil rate. Area 110 can display meter reading can be plotted relative to a meter reading intensities (in the y-axis) over time (in the X-axis).

Figures 1, 1B:
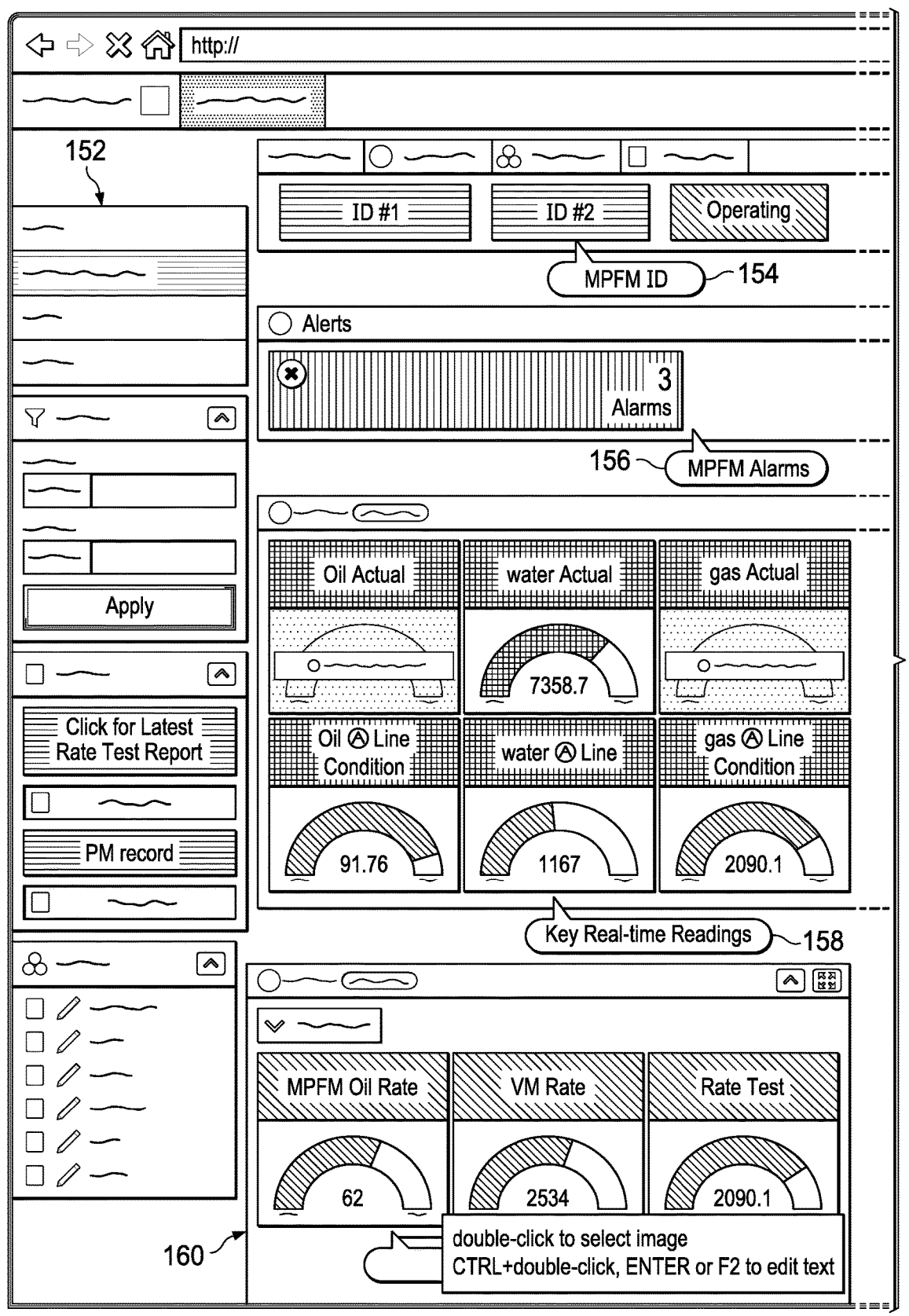
Figures 1, 1B, 2:
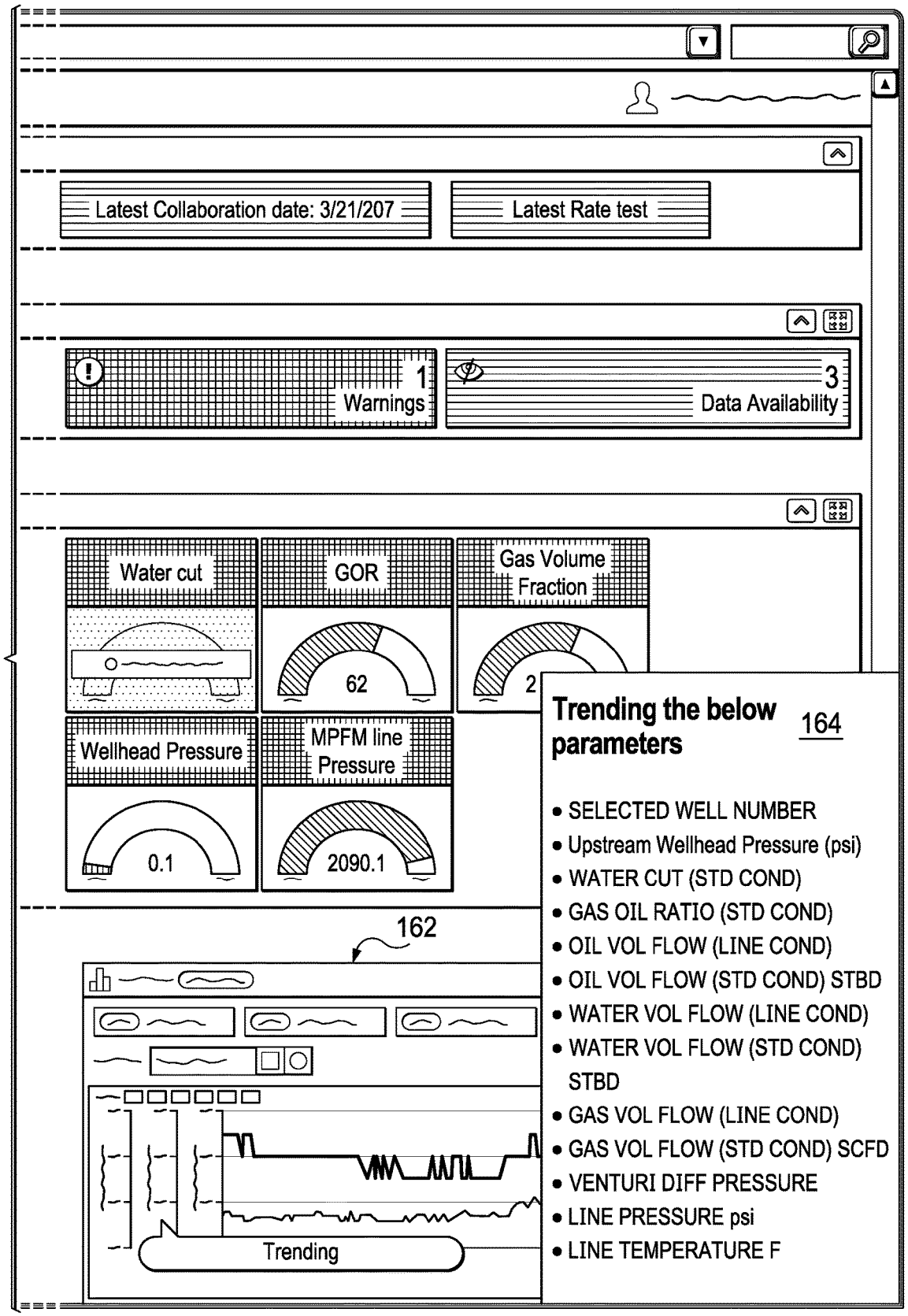

FIGS. 1B-1 and 1B-2 collectively show a screenshot of an example of a user interface 150 for displaying MPFM health information, according to some implementations of the present disclosure. The user interface 150 includes a user input area 152 where the user can make selections that control the information displayed in the user interface 150. Information areas in the user interface 150 can include MPFM identifiers 154, MPFM alarms 156, key real-time readings 158, rate curves 160, a trends graph 162, and trending parameters 164.

Figure 1C:
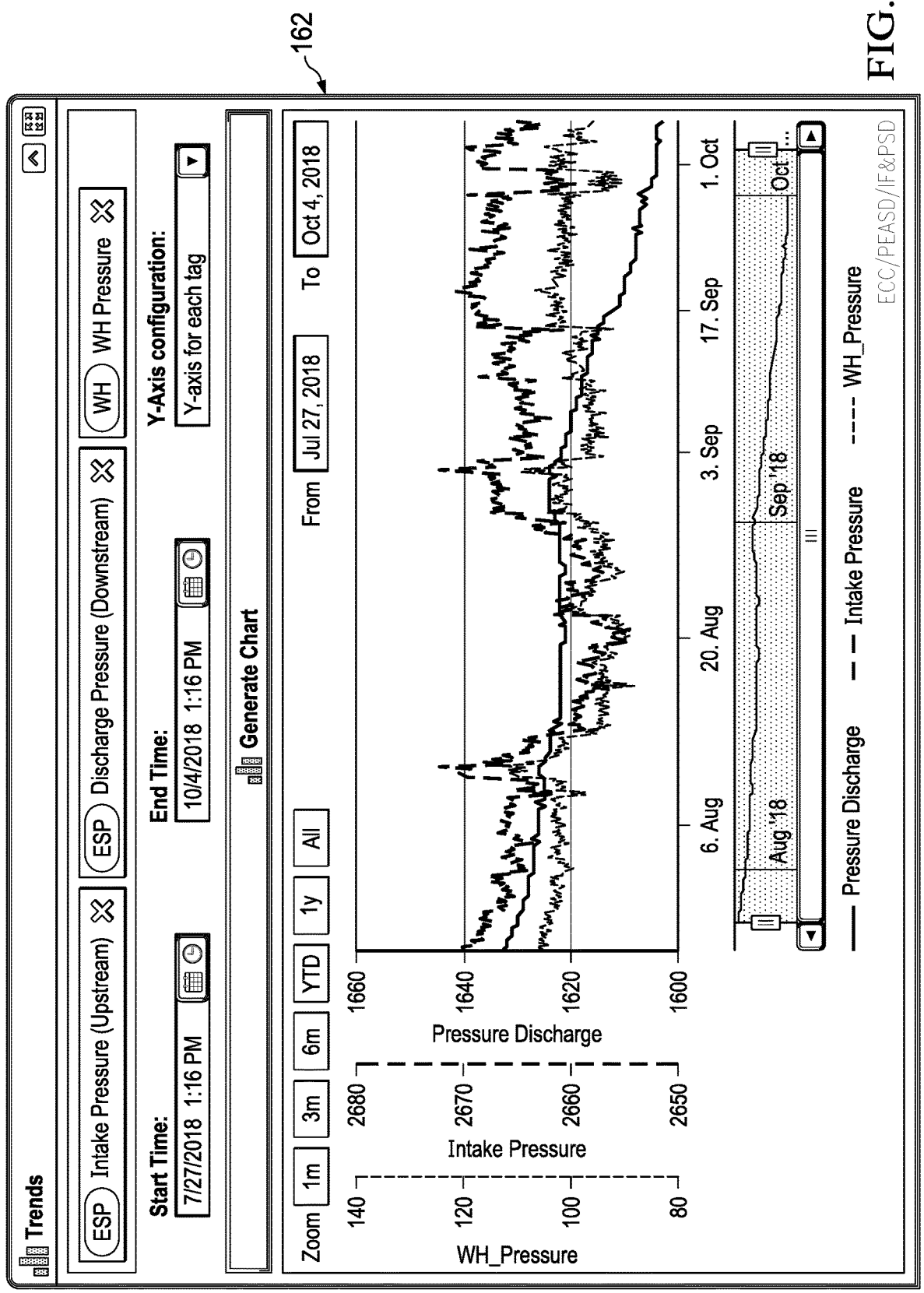
FIG. 1C shows a screenshot of an example of a trends graph for displaying MPFM health information, according to some implementations of the present disclosure.

FIG. 1C shows a screenshot of an example of the trends graph 162 for displaying MPFM health information, according to some implementations of the present disclosure.

Figures 1, 1D:
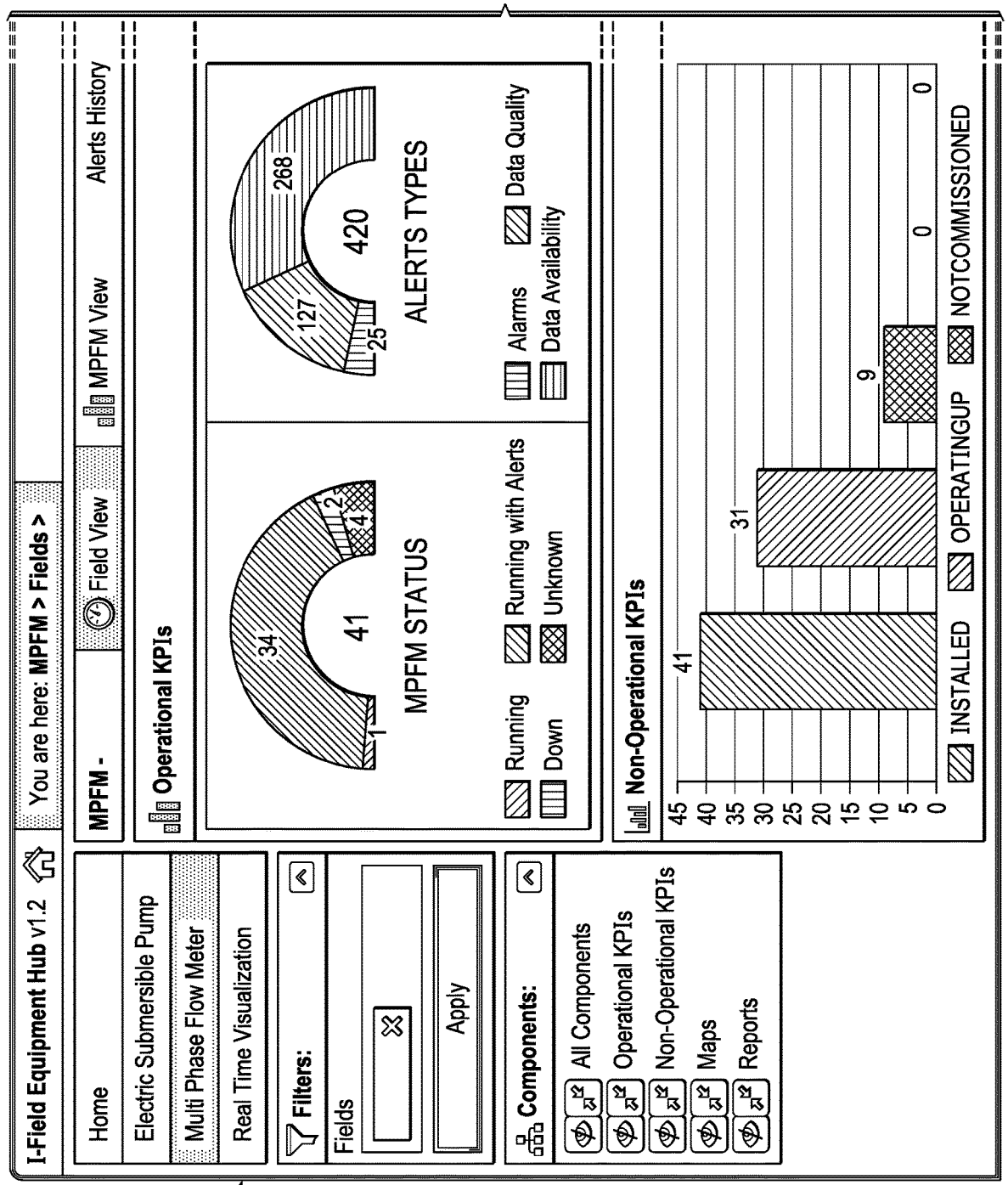
Figures 1, 1D, 2:
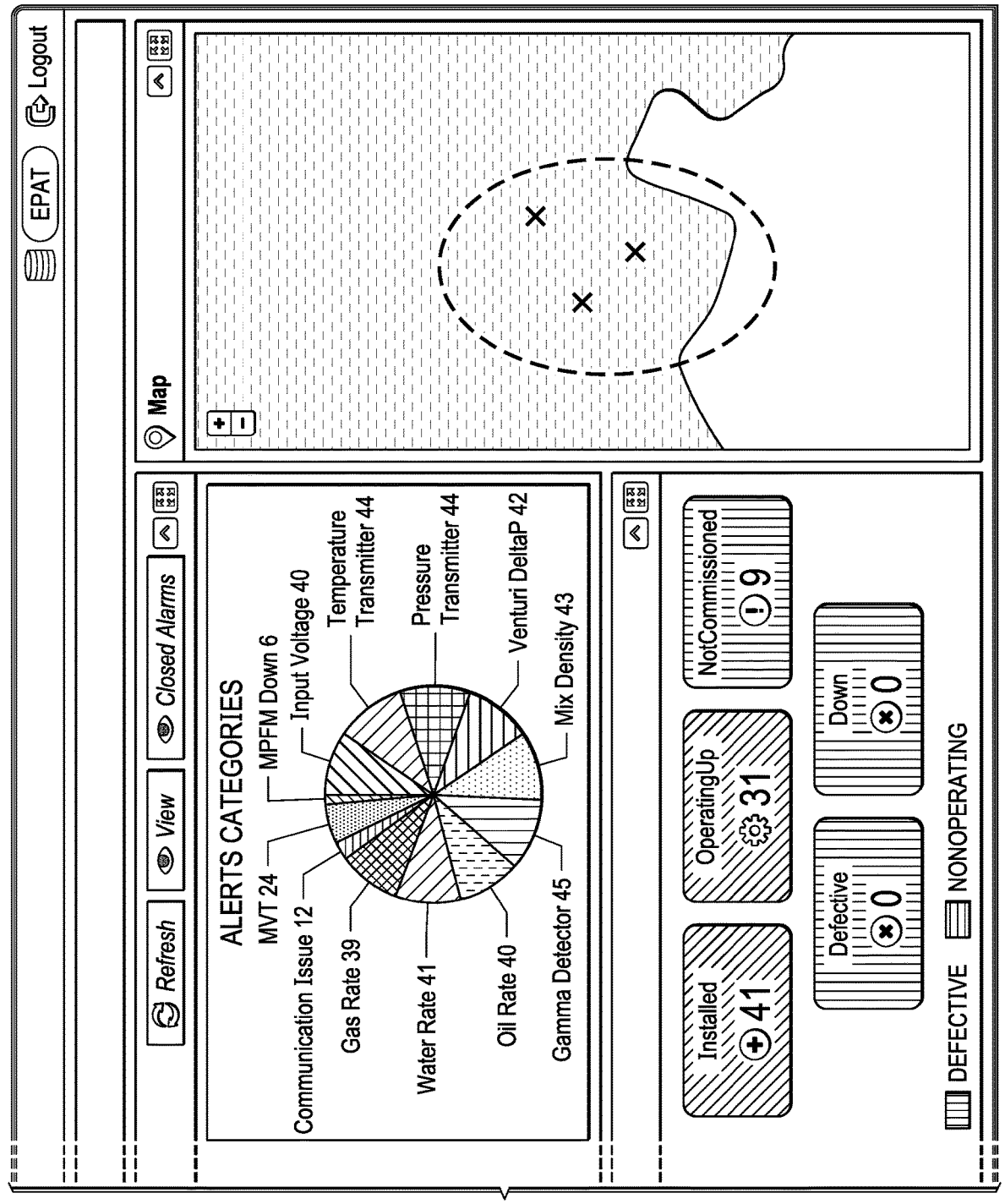

FIGS. 1D-1 and 1D-2 collectively show a screenshot of another example of the user interface 150 for displaying MPFM health information, according to some implementations of the present disclosure.

Figures 1, 1E:
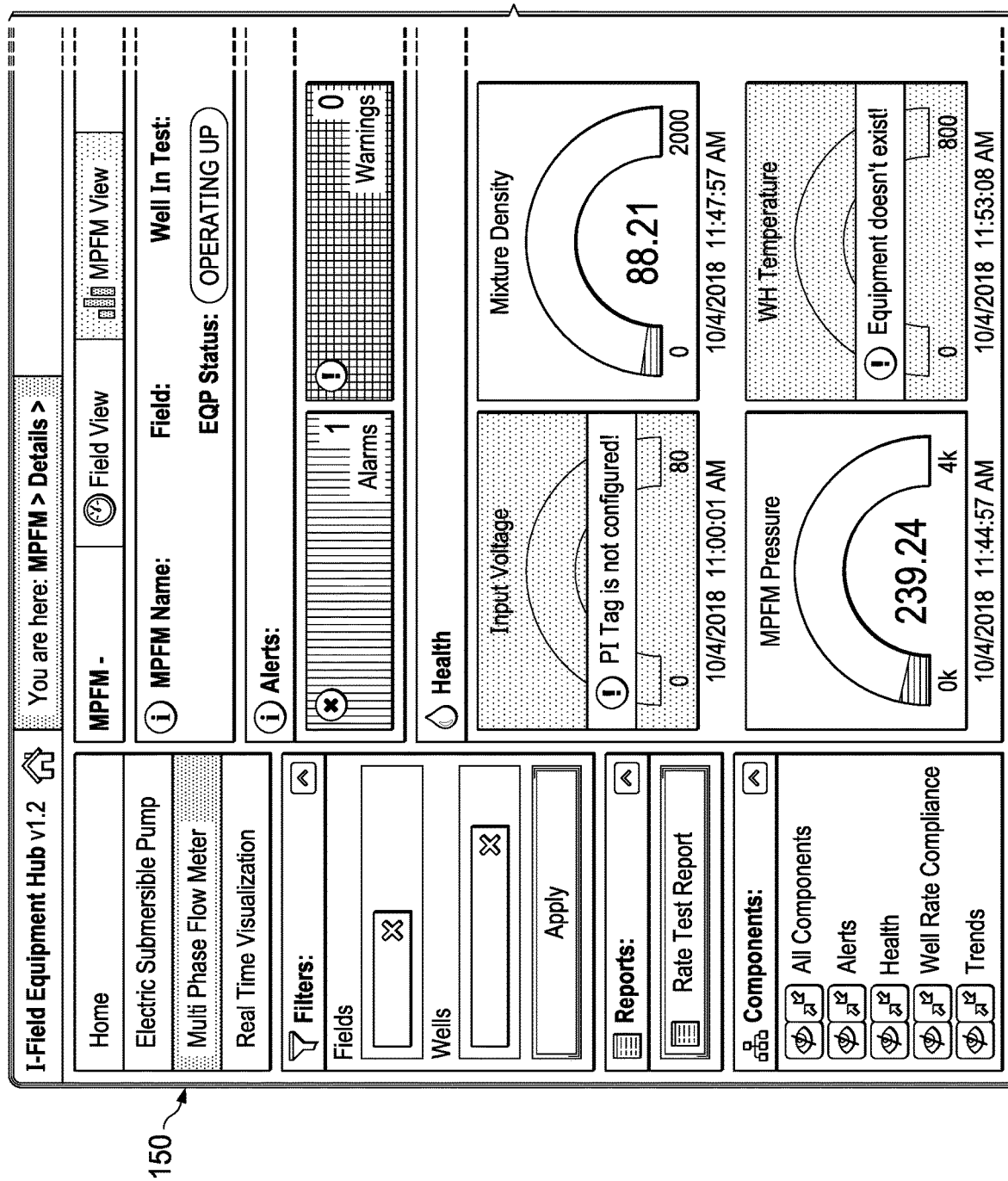
Figures 1, 1E, 2:
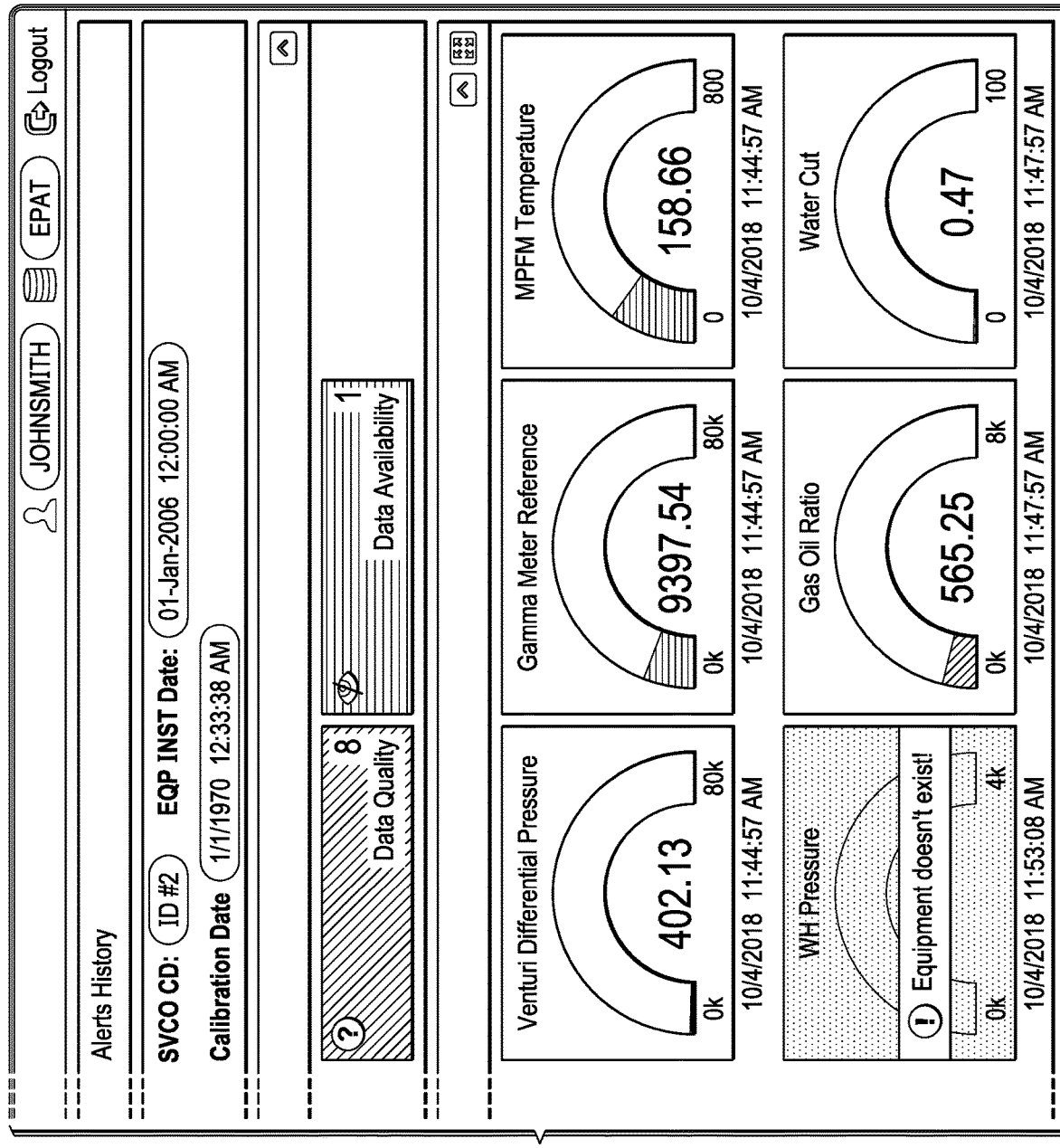
Figure 2:
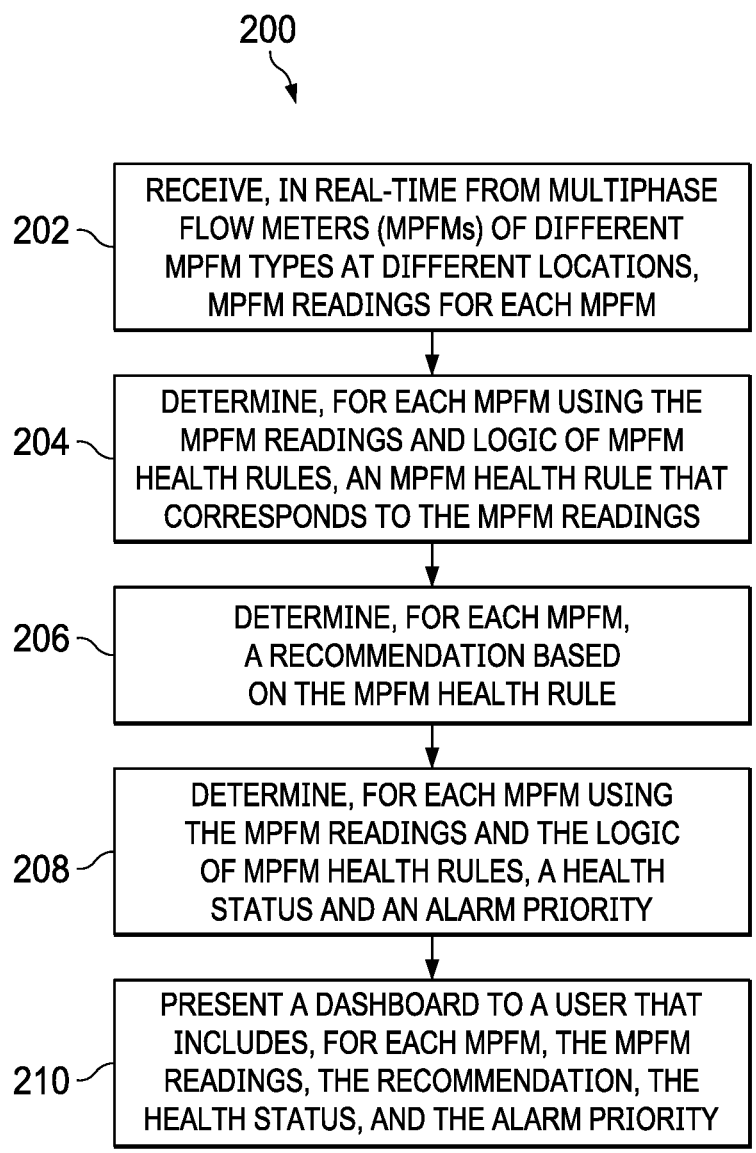

FIGS. 1E-1 and 1E-2 collectively show a screenshot of another example of the user interface 150 for displaying MPFM health information, according to some implementations of the present disclosure.

FIG. 2 is a flowchart of an example of a method 200 for generating MPFM health information, according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 202, MPFM readings of different MPFM types are received in real-time from MPFMs at different locations. For example, the analytics system can receive readings from MPFMs in a particular area or for a particular oil field. From 202, method 200 proceeds to 204.

At 204, for each MPFM, an MPFM health rule that corresponds to the MPFM readings is determined using the MPFM readings and logic of MPFM health rules. For example, a particular row in Table 1 can be identified that includes logic values indicated in the second column of Table 1 (for parameters identified in the third column). From 204, method 200 proceeds to 206.

At 206, a recommendation is determined for each MPFM based the MPFM health rule. For example, the recommendation for an MPFM health rule can be looked up in the third column of Table 3. For example, MPFM health rules be used to implement logic (including special purpose logic developed in-house) for automatically triggering and highlighting major MPFM maintenance issues. The information can be provided to vendors who have opted into features such as "alarms by exceptions" and "automated recommendations." Information provided to vendors can include field-level views of health-related information. The information can also present the priority of particular alarms. Recommendations that are determined can include recommended actions to be taken or a statement/notification to be made. From 206, method 200 proceeds to 208.

At 208, a health status and an alarm priority are determined for each MPFM. The health status can be, for example, operating with no alarms, operating with at least one alarm, and being down, as indicated in the second column of Table 2. The health status can be determined, for example, based on an MPFM pressure, a Venturi differential pressure, and a number of alarms in alarming tags of the MPFM, as indicated by the third column of Table 3. The alarm priority (for example, minor or major) can be determined based on the MPFM health rule, for example, as determined by Table 3. From 208, method 200 proceeds to 210.

At 210, a dashboard is presented to a user that includes, for each MPFM, the MPFM readings, the recommendation, the health status, and the alarm priority. As an example, the dashboard that is presented can include components of the user interface 100. Presenting the dashboard can include grouping and prioritizing information in the dashboard by the alarm priority, such as grouped by the tabs 102. Presenting the dashboard can include presenting, for each MPFM, a visual meter representation, including the meters displayed in the meter display area 106. The visual meter representations can be annotated the with the alarm priority, such as shading selected parts of each displayed meter with red, yellow, green, or blue, depending on the priority.

In some implementations, as indicated in Table 3, the recommendations can include one of (or combinations of): notifying of a communication issue, notifying of a flow computer issue, notifying of a failure, requesting maintenance to fix an input power issue, issuing a warning of a percentage of flow rate uncertainty increase, performing calibration including flushing the MPFM to remove fluid inside a pipe electrode, contacting a vendor to troubleshoot temperature transmitter, contacting the vendor to troubleshoot pressure transmitter, contacting the vendor to troubleshooting a gamma detector system, contacting the vendor to troubleshoot a flow computer, and contacting the vendor to troubleshoot a flow computer battery. After 210, method 200 can stop.

In some implementations, method 200 can include steps for performing machine learning in order to populate information in Tables 1, 2, and 3. Statistics, historical information, and user input can help to determine the logic and recommendations to be made when certain conditions exist in MPFMs.

Figure 3:
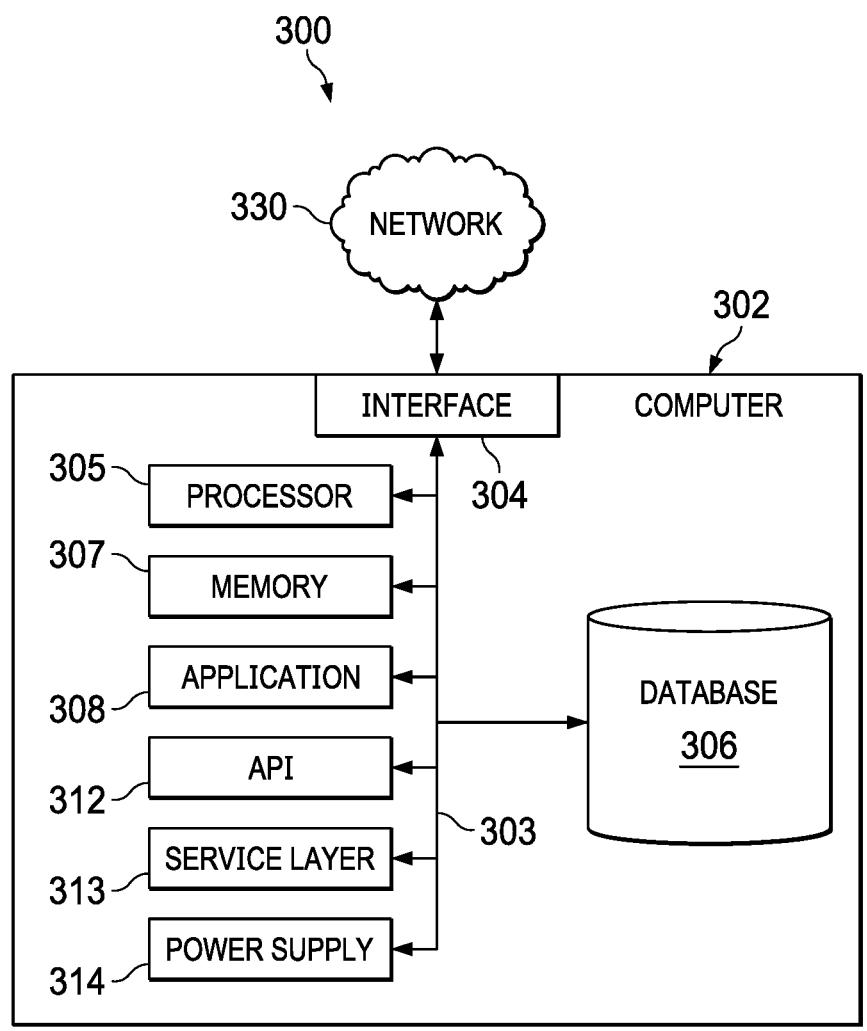
FIG. 3 is a block diagram illustrating an example computer system used to provide computational functionalities associated with described algorithms, methods, functions, processes, flows, and procedures as described in the present disclosure, according to some implementations of the present disclosure.

FIG. 3 is a block diagram of an example computer system 300 used to provide computational functionalities associated with described algorithms, methods, functions, processes, flows, and procedures described in the present disclosure, according to some implementations of the present disclosure. The illustrated computer 302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 302 can include input devices such as keypads, keyboards, and touch screens that can accept user information. Also, the computer 302 can include output devices that can convey information associated with the operation of the computer 302. The information can include digital data, visual data, audio information, or a combination of information. The information can be presented in a graphical user interface (UI) (or GUI).

The computer 302 can serve in a role as a client, a network component, a server, a database, a persistency, or components of a computer system for performing the subject matter described in the present disclosure. The illustrated computer 302 is communicably coupled with a network 330. In some implementations, one or more components of the computer 302 can be configured to operate within different environments, including cloud-computing-based environments, local environments, global environments, and combinations of environments.

At a top level, the computer 302 is an electronic computing device operable to receive, transmit, process, store, and manage data and information associated with the described subject matter. According to some implementations, the computer 302 can also include, or be communicably coupled with, an application server, an email server, a web server, a caching server, a streaming data server, or a combination of servers.

The computer 302 can receive requests over network 330 from a client application (for example, executing on another computer 302). The computer 302 can respond to the received requests by processing the received requests using software applications. Requests can also be sent to the computer 302 from internal users (for example, from a command console), external (or third) parties, automated applications, entities, individuals, systems, and computers.

Each of the components of the computer 302 can communicate using a system bus 303. In some implementations, any or all of the components of the computer 302, including hardware or software components, can interface with each other or the interface 304 (or a combination of both) over the system bus 303. Interfaces can use an application programming interface (API) 312, a service layer 313, or a combination of the API 312 and service layer 313. The API 312 can include specifications for routines, data structures, and object classes. The API 312 can be either computer-language independent or dependent. The API 312 can refer to a complete interface, a single function, or a set of APIs.

The service layer 313 can provide software services to the computer 302 and other components (whether illustrated or not) that are communicably coupled to the computer 302. The functionality of the computer 302 can be accessible for all service consumers using this service layer. Software services, such as those provided by the service layer 313, can provide reusable, defined functionalities through a defined interface. For example, the interface can be software written in JAVA, C++, or a language providing data in extensible markup language (XML) format. While illustrated as an integrated component of the computer 302, in alternative implementations, the API 312 or the service layer 313 can be stand-alone components in relation to other components of the computer 302 and other components communicably coupled to the computer 302. Moreover, any or all parts of the API 312 or the service layer 313 can be implemented as child or sub-modules of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302 and the described functionality. The interface 304 can be used by the computer 302 for communicating with other systems that are connected to the network 330 (whether illustrated or not) in a distributed environment. Generally, the interface 304 can include, or be implemented using, logic encoded in software or hardware (or a combination of software and hardware) operable to communicate with the network 330. More specifically, the interface 304 can include software supporting one or more communication protocols associated with communications. As such, the network 330 or the interface's hardware can be operable to communicate physical signals within and outside of the illustrated computer 302.

The computer 302 includes a processor 305. Although illustrated as a single processor 305 in FIG. 3, two or more processors 305 can be used according to particular needs, desires, or particular implementations of the computer 302 and the described functionality. Generally, the processor 305 can execute instructions and can manipulate data to perform the operations of the computer 302, including operations using algorithms, methods, functions, processes, flows, and procedures as described in the present disclosure.

The computer 302 also includes a database 306 that can hold data for the computer 302 and other components connected to the network 330 (whether illustrated or not). For example, database 306 can be an in-memory, conventional, or a database storing data consistent with the present disclosure. In some implementations, database 306 can be a combination of two or more different database types (for example, hybrid in-memory and conventional databases) according to particular needs, desires, or particular implementations of the computer 302 and the described functionality. Although illustrated as a single database 306 in FIG. 3, two or more databases (of the same, different, or combination of types) can be used according to particular needs, desires, or particular implementations of the computer 302 and the described functionality. While database 306 is illustrated as an internal component of the computer 302, in alternative implementations, database 306 can be external to the computer 302.

The computer 302 also includes a memory 307 that can hold data for the computer 302 or a combination of components connected to the network 330 (whether illustrated or not). Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same, different, or combination of types) can be used according to particular needs, desires, or particular implementations of the computer 302 and the described functionality. While memory 307 is illustrated as an internal component of the computer 302, in alternative implementations, memory 307 can be external to the computer 302.

The application 308 can be an algorithmic software engine providing functionality according to particular needs, desires, or particular implementations of the computer 302 and the described functionality. For example, application 308 can serve as one or more components, modules, or applications. Further, although illustrated as a single application 308, the application 308 can be implemented as multiple applications 308 on the computer 302. In addition, although illustrated as internal to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion and management circuits, including recharging, standby, and power management functionalities. In some implementations, the power-supply 314 can include a power plug to allow the computer 302 to be plugged into a wall socket or a power source to, for example, power the computer 302 or recharge a rechargeable battery.

There can be any number of computers 302 associated with, or external to, a computer system containing computer 302, with each computer 302 communicating over network 330. Further, the terms "client," "user," and other appropriate terminology can be used interchangeably, as appropriate, without departing from the scope of the present disclosure. Moreover, the present disclosure contemplates that many users can use one computer 302 and one user can use multiple computers 302.

Described implementations of the subject matter can include one or more features, alone or in combination.

For example, in a first implementation, a computer-implemented method includes the following. MPFM readings of different MPFM types are received in real-time from MPFMs at different locations. For each MPFM, an MPFM health rule that corresponds to the MPFM readings is determined using the MPFM readings and logic of MPFM health rules. A recommendation is determined for each MPFM based on the MPFM health rule. A health status and an alarm priority are determined for each MPFM using the MPFM readings and the logic of MPFM health rules. A dashboard is presented to a user that includes, for each MPFM, the MPFM readings, the recommendation, the health status, and the alarm priority.

The foregoing and other described implementations can each, optionally, include one or more of the following features:

A first feature, combinable with any of the following features, where the health status is selected from a group including operating with no alarms, operating with at least one alarm, and being down.

A second feature, combinable with any of the previous or following features, where determining the health status is based on an MPFM pressure, a Venturi differential pressure, and a number of alarms in alarming tags of the MPFM.

A third feature, combinable with any of the previous or following features, where determining the alarm priority is based on the MPFM health rule.

A fourth feature, combinable with any of the previous or following features, where presenting the dashboard includes grouping and prioritizing information in the dashboard by the alarm priority.

A fifth feature, combinable with any of the previous or following features, where presenting the dashboard includes presenting, for each MPFM, a visual meter representation.

A sixth feature, combinable with any of the previous or following features, the method further including annotating the visual meter representation with the alarm priority.

A seventh feature, combinable with any of the previous or following features, where the recommendation is selected from a group including notifying of a communication issue, notifying of a flow computer issue, notifying of a failure, requesting maintenance to fix an input power issue, issuing a warning of a percentage of flow rate uncertainty increase, performing calibration including flushing the MPFM to remove fluid inside a pipe electrode, contacting a vendor to troubleshoot temperature transmitter, contacting the vendor to troubleshoot pressure transmitter, contacting the vendor to troubleshooting a gamma detector system, contacting the vendor to troubleshoot a flow computer, and contacting the vendor to troubleshoot a flow computer battery.

In a second implementation, a non-transitory, computer-readable medium stores one or more instructions executable by a computer system to perform operations including the following. MPFM readings of different MPFM types are received in real-time from MPFMs at different locations. For each MPFM, an MPFM health rule that corresponds to the MPFM readings is determined using the MPFM readings and logic of MPFM health rules. A recommendation is determined for each MPFM based on the MPFM health rule. A health status and an alarm priority are determined for each MPFM using the MPFM readings and the logic of MPFM health rules. A dashboard is presented to a user that includes, for each MPFM, the MPFM readings, the recommendation, the health status, and the alarm priority.

The foregoing and other described implementations can each, optionally, include one or more of the following features:

A first feature, combinable with any of the following features, where the health status is selected from a group including operating with no alarms, operating with at least one alarm, and being down.

A second feature, combinable with any of the previous or following features, where determining the health status is based on an MPFM pressure, a Venturi differential pressure, and a number of alarms in alarming tags of the MPFM.

A third feature, combinable with any of the previous or following features, where determining the alarm priority is based on the MPFM health rule.

A fourth feature, combinable with any of the previous or following features, where presenting the dashboard includes grouping and prioritizing information in the dashboard by the alarm priority.

A fifth feature, combinable with any of the previous or following features, where presenting the dashboard includes presenting, for each MPFM, a visual meter representation.

In a third implementation, a computer-implemented system includes sensors coupled to MPFMs of different types and at one or more different locations, one or more sensor data processors for processing MPFM health information received from the sensors, and a non-transitory computer-readable storage medium. The non-transitory computer-readable storage medium coupled to the one or more sensor data processors and stores programming instructions for execution by the one or more sensor data processors. The programming instructions instruct the one or more sensor data processors to perform operations including the following. MPFM readings of different MPFM types are received in real-time from MPFMs at different locations. For each MPFM, an MPFM health rule that corresponds to the MPFM readings is determined using the MPFM readings and logic of MPFM health rules. A recommendation is determined for each MPFM based on the MPFM health rule. A health status and an alarm priority are determined for each MPFM using the MPFM readings and the logic of MPFM health rules. A dashboard is presented to a user that includes, for each MPFM, the MPFM readings, the recommendation, the health status, and the alarm priority.

The foregoing and other described implementations can each, optionally, include one or more of the following features:

A first feature, combinable with any of the following features, where the health status is selected from a group including operating with no alarms, operating with at least one alarm, and being down.

A second feature, combinable with any of the previous or following features, where determining the health status is based on an MPFM pressure, a Venturi differential pressure, and a number of alarms in alarming tags of the MPFM.

A third feature, combinable with any of the previous or following features, where determining the alarm priority is based on the MPFM health rule.

A fourth feature, combinable with any of the previous or following features, where presenting the dashboard includes grouping and prioritizing information in the dashboard by the alarm priority.

A fifth feature, combinable with any of the previous or following features, where presenting the dashboard includes presenting, for each MPFM, a visual meter representation.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   receiving, in real-time from multiphase flow meters (MPFMs) of different MPFM types at different locations, MPFM readings for each MPFM;
   determining, for each MPFM using the MPFM readings and logic of MPFM health rules, an MPFM health rule that corresponds to the MPFM readings;
   determining, for each MPFM, a recommendation based on the MPFM health rule;
   determining, for each MPFM using the MPFM readings and the logic of MPFM health rules, a health status and an alarm priority; and
   presenting a dashboard to a user that includes, for each MPFM, the MPFM readings, the recommendation, the health status, and the alarm priority.

2. The computer-implemented method of claim 1, wherein the health status is selected from a group comprising operating with no alarms, operating with at least one alarm, and being down.

3. The computer-implemented method of claim 1, wherein determining the health status is based on an MPFM pressure, a Venturi differential pressure, and a number of alarms in alarming tags of the MPFM.

4. The computer-implemented method of claim 1, wherein determining the alarm priority is based on the MPFM health rule.

5. The computer-implemented method of claim 1, wherein presenting the dashboard includes grouping and prioritizing information in the dashboard by the alarm priority.

6. The computer-implemented method of claim 1, wherein presenting the dashboard includes presenting, for each MPFM, a visual meter representation.

7. The computer-implemented method of claim 6, further comprising annotating the visual meter representation with the alarm priority.

8. The computer-implemented method of claim 1, wherein the recommendation is selected from a group comprising notifying of a communication issue, notifying of a flow computer issue, notifying of a failure, requesting maintenance to fix an input power issue, issuing a warning of a percentage of flow rate uncertainty increase, performing calibration including flushing the MPFM to remove fluid inside a pipe electrode, contacting a vendor to troubleshoot temperature transmitter, contacting the vendor to troubleshoot pressure transmitter, contacting the vendor to troubleshooting a gamma detector system, contacting the vendor to troubleshoot a flow computer, and contacting the vendor to troubleshoot a flow computer battery.

9. A non-transitory, computer-readable medium storing one or more instructions executable by a computer system to perform operations comprising:
   receiving, in real-time from multiphase flow meters (MPFMs) of different MPFM types at different locations, MPFM readings for each MPFM;
   determining, for each MPFM using the MPFM readings and logic of MPFM health rules, an MPFM health rule that corresponds to the MPFM readings;
   determining, for each MPFM, a recommendation based on the MPFM health rule;
   determining, for each MPFM using the MPFM readings and the logic of MPFM health rules, a health status and an alarm priority; and presenting a dashboard to a user that includes, for each MPFM, the MPFM readings, the recommendation, the health status, and the alarm priority.

10. The non-transitory, computer-readable medium of claim 9, wherein the health status is selected from a group comprising operating with no alarms, operating with at least one alarm, and being down.

11. The non-transitory, computer-readable medium of claim 9, wherein determining the health status is based on an MPFM pressure, a Venturi differential pressure, and a number of alarms in alarming tags of the MPFM.

12. The non-transitory, computer-readable medium of claim 9, wherein determining the alarm priority is based on the MPFM health rule.

13. The non-transitory, computer-readable medium of claim 9, wherein presenting the dashboard includes grouping and prioritizing information in the dashboard by the alarm priority.

14. The non-transitory, computer-readable medium of claim 9, wherein presenting the dashboard includes presenting, for each MPFM, a visual meter representation.

15. A computer-implemented system, comprising:
sensors coupled to multiphase flow meters (MPFMs) of different types and at one or more different locations;
one or more sensor data processors for processing MPFM health information received from the sensors; and
a non-transitory computer-readable storage medium coupled to the one or more sensor data processors and storing programming instructions for execution by the one or more sensor data processors, the programming instructions instructing the one or more sensor data processors to perform operations comprising:
receiving, in real-time from multiphase flow meters (MPFMs) of different MPFM types at different locations, MPFM readings for each MPFM;
determining, for each MPFM using the MPFM readings and logic of MPFM health rules, an MPFM health rule that corresponds to the MPFM readings;
determining, for each MPFM, a recommendation based on the MPFM health rule;
determining, for each MPFM using the MPFM readings and the logic of MPFM health rules, a health status and an alarm priority; and
presenting a dashboard to a user that includes, for each MPFM, the MPFM readings, the recommendation, the health status, and the alarm priority.

16. The computer-implemented system of claim 15, wherein the health status is selected from a group comprising operating with no alarms, operating with at least one alarm, and being down.

17. The computer-implemented system of claim 15, wherein determining the health status is based on an MPFM pressure, a Venturi differential pressure, and a number of alarms in alarming tags of the MPFM.

18. The computer-implemented system of claim 15, wherein determining the alarm priority is based on the MPFM health rule.

19. The computer-implemented system of claim 15, wherein presenting the dashboard includes grouping and prioritizing information in the dashboard by the alarm priority.

20. The computer-implemented system of claim 15, wherein presenting the dashboard includes presenting, for each MPFM, a visual meter representation.

\* \* \* \* \*